(12) United States Patent
Ma et al.

(10) Patent No.: US 7,389,444 B2
(45) Date of Patent: Jun. 17, 2008

(54) METHOD AND SYSTEM FOR TROUBLESHOOTING A MISCONFIGURATION OF A COMPUTER SYSTEM BASED ON PRODUCT SUPPORT SERVICES INFORMATION

(75) Inventors: Wei-Ying Ma, Beijing (CN); Yi-Min Wang, Bellevue, WA (US); Ji-Rong Wen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 10/899,939

(22) Filed: Jul. 27, 2004

(65) Prior Publication Data

US 2006/0025962 A1    Feb. 2, 2006

(51) Int. Cl.
    *G06F 11/00*    (2006.01)
(52) U.S. Cl. ....................................... 714/26
(58) Field of Classification Search .................. 714/26
    See application file for complete search history.

(56) References Cited

U.S. PATENT DOCUMENTS

| | | | | |
|---|---|---|---|---|
| 5,822,743 | A * | 10/1998 | Gupta et al. | 706/50 |
| 7,010,718 | B2 * | 3/2006 | Ogawa et al. | 714/4 |
| 7,051,243 | B2 * | 5/2006 | Helgren et al. | 714/48 |
| 7,100,084 | B2 * | 8/2006 | Unkle et al. | 714/26 |
| 7,137,041 | B2 * | 11/2006 | Kaminsky et al. | 714/47 |
| 7,146,536 | B2 * | 12/2006 | Bingham et al. | 714/26 |
| 7,233,935 | B1 * | 6/2007 | Chandler | 706/47 |
| 2005/0027845 | A1 * | 2/2005 | Secor et al. | 709/223 |

OTHER PUBLICATIONS

Jaccard Index, wikipedia entry, 2007.*
TD-IDF, wikipedia entry, 2007.*
U.S. Appl. No. 60/547,608, filed Feb. 24, 2004, Chad E. Verbowski.
U.S. Appl. No. 60/547,607, filed Feb. 24, 2004, Jiahe Helen Wang.
Wang, Yi-Min, "Persistent-State Checkpoint Comparison for Troubleshooting Configuration Failures," Technical Report, Microsoft Research, R3Edmond, Washington, Apr. 4, 2003 (7 pages).
Wang, Yi-Min, et al., "STRIDER: A Black-Box, State-based Approach to Change and Configuration Management and Support," Proceedings of the 17th Large Installation Systems Administration Conference, 2003 LISA XVII, Oct. 26-31, 2003, San Diego, California (14 pages).

* cited by examiner

*Primary Examiner*—Bryce P Bonzo
(74) *Attorney, Agent, or Firm*—Perkins Coie LLP (57) ABSTRACT

A method and system for ranking possible causes of a component exhibiting a certain behavior is provided. In one embodiment, a troubleshooting system ranks candidate configuration parameters that may be causing a software application to exhibit an undesired behavior using support information relating to problems resulting from the settings of configuration parameters. The support information may be collected from problem reports generated by product support services personnel when troubleshooting problems that users encounter with the application. The troubleshooting system ranks the candidate configuration parameters as likely causing the application to exhibit the undesired behavior based on analysis of the support information.

35 Claims, 5 Drawing Sheets

METHOD AND SYSTEM FOR TROUBLESHOOTING A MISCONFIGURATION OF A COMPUTER SYSTEM BASED ON PRODUCT SUPPORT SERVICES INFORMATION

TECHNICAL FIELD

The described technology relates generally to identifying a configuration parameter whose value is causing an undesired behavior.

BACKGROUND

An ever-increasing number of applications (i.e., computer software) with various features are available to users of personal computers. Users can tailor the operation of these applications to suit their needs by specifying various configuration parameters. For example, a browser application may have a configuration parameter that provides a URL of a web page that is displayed initially whenever the browser application starts (i.e., "a home page"). The browser application may also have configuration parameters that identify programs to be invoked to process certain types of content (e.g., a "jpeg" file) and that specify passwords to be used when the application connects to various servers. The values of the configuration parameters can be stored in application-specific configuration files such as UNIX resource files or in a central registry such as the Windows® registry file. The application-specific configuration file for an application may have an internal format that is specific to that application. The Windows® registry file organizes configuration parameters hierarchically with each configuration parameter having a path and optionally a value. The applications access these files to store and retrieve their configuration parameters.

If certain configuration parameters are incorrect, then the applications may exhibit an undesired behavior. For example, if the value of a home page configuration parameter is not set correctly, then when the browser application starts, it will exhibit an undesired behavior by not displaying a home page or displaying the wrong home page. If a configuration parameter incorrectly indicates a certain text editor should be invoked to process a graphics file, then the undesired behavior will be the incorrect display of the graphics content. Similarly, if a password configuration parameter has the wrong password, then the failure to connect to the server will be the undesired behavior.

Because of the complexity of applications and their large number of configuration parameters, it can be very time-consuming to troubleshoot which configuration parameters are at fault for causing an application to exhibit the undesired behavior. Most users of personal computers have difficulty performing this troubleshooting. As a result, users typically rely on technical support personnel to assist in the troubleshooting. This troubleshooting not only is expensive but also users may experience a significant productivity loss as a result of their inability to effectively use an application that is exhibiting an undesired behavior.

Typically, technical support personnel use an ad hoc approach to troubleshooting configuration problems. The personnel, using knowledge gained from experiencing similar problems, will try to narrow in on the at-fault configuration parameter. This ad hoc approach can take a considerable amount of time, especially if it is a combination of configuration parameters that are incorrect. In some cases, the technical support personnel may compare the configuration parameters to a set of "ideal" configuration parameters for that application. Because of the large number of configuration parameters available and the large number of possible values for each configuration parameter, many of the configuration parameters will have no "ideal" value. Thus, technical support personnel still need to review those configuration parameters of the application that are different from the set of ideal configuration parameters.

Technical support personnel, especially members of a product support services group that is supporting an application, may handle a large number of requests from users to help in troubleshooting problems of the application. When a request is received, the technical support personnel may generate a problem report that describes the problem or the symptom. When the problem is solved, the technical support personnel may close the problem report and add a description of the solution to the problem report. In many cases, the solution may be to change a configuration parameter.

A technique for troubleshooting configuration parameters has been proposed that uses "persistent-state checkpoints" to identify configuration parameters that have been modified since an application was last known to not exhibit the undesired behavior. Some operating systems can be configured to automatically create copies of configuration parameters (i.e., a checkpoint) at certain intervals. The technique may compare the current configuration parameters to the configuration parameters of a checkpoint taken when the application was known to not exhibit the undesired behavior to identify those that have been modified. This set of modified configuration parameters is referred to as a "difference set." Since the number of configuration parameters in the difference set may be large, the technique generates a trace of the configuration parameters that are accessed when the application exhibits the undesired behavior. This set of accessed configuration parameters is referred to as a "trace set." The technique intersects the difference set with the trace set to identify an "intersection set." The technique may then rank the configuration parameters of the intersection set based on the relative order of their appearance in the trace set or based on an inverse document frequency calculation in which difference sets derived from consecutive checkpoints represent documents. Such a technique is described in the "Persistent-state Checkpoint Comparison for Troubleshooting Configuration Failures," by Wang, Y., Verbowski, C., and Simon D., Proc. IEEE International Conference on Dependable Systems and Networks (DSN), June 2003, which is hereby incorporated by reference.

It would be desirable to provide an alternative technique, which does not rely on difference sets of consecutive checkpoints, for ranking configuration parameters that may be at fault for causing an application to exhibit an undesired behavior.

SUMMARY

A method and system for ranking likely causes of a component (e.g., application or hardware device) to exhibit a certain behavior is provided. A system performs an analysis on candidate causes (e.g., configuration parameters of an application) and support information (e.g., problem reports generated by a product support services group) to rank the candidate causes. The system then ranks the candidate causes based on the analysis. The system may base the ranking of the candidate causes on the frequency with which a candidate cause appears in the support information. Alternatively, the system may base the ranking of the candidate causes on support information that relates to a candidate cause and that has a problem symptom that is similar to a current symptom describing the certain behavior.

DETAILED DESCRIPTION

A method and system for ranking possible causes of a component exhibiting a certain behavior is provided. In one embodiment, a troubleshooting system ranks candidate configuration parameters that may be causing a software application to exhibit an undesired behavior using support information relating to problems resulting from the settings of configuration parameters. The support information may be collected from problem reports generated by product support services personnel when troubleshooting problems that users encounter with the application. A problem report may include a description of the problem (also referred to as the "symptom"), the identity of the application that is exhibiting the undesired behavior, and a description of the solution. The description of the solution may include information on the state of the user computer when the undesired behavior was exhibited. The state information may include configuration parameters. Thus, the support information may represent problem reports as occurrences of state (e.g., configuration parameters), symptom, software, and solution four-tuples. The troubleshooting system ranks the candidate configuration parameters as likely causing the application to exhibit the undesired behavior based on analysis of the occurrences. In one embodiment, the troubleshooting system ranks a candidate configuration parameter based on the number of occurrences relating to that candidate configuration parameter within the support information. This ranking of candidate configuration parameters based on number of occurrences is referred to as "frequency ranking." Frequency ranking is based on the assumption that configuration parameters that have frequently caused problems have a high likelihood of causing additional problems. In another embodiment, the troubleshooting system ranks a candidate configuration parameter based on the similarity of the current symptom of the undesired behavior to symptoms within occurrences relating to the candidate configuration parameter. This ranking of candidate configuration parameters based on symptoms is referred to as "symptom ranking." Symptom ranking is based on the assumption that past problems with similar symptoms for related configuration parameters indicate that a candidate configuration parameter is likely causing the current undesired behavior. In this way, the troubleshooting system can identify a configuration parameter that may be the cause of an application exhibiting an undesired behavior based on support information collected from troubleshooting user computers.

In one embodiment, the troubleshooting system ranks candidate configuration parameters using frequency ranking. For each candidate configuration parameter, the troubleshooting system counts the number of occurrences in the support information that include a problem configuration parameter that is related to the candidate configuration parameter. For example, the candidate configuration parameter "A\B\C=10" may have a count of 135, and the candidate configuration parameter "D\E\F\G" may have a count of 15. The troubleshooting system ranks the candidate configuration parameter with the count of 135 higher than the candidate configuration parameter with the frequency count of 15. The troubleshooting system may also weight the counts as described below based on how related a problem configuration parameter is to a candidate configuration parameter. For example, a problem configuration parameter of "D\E\F" may be more related than a problem configuration parameter of "D\E" to a candidate configuration parameter of "D\E\F\G."

In one embodiment, the troubleshooting system ranks candidate configuration parameters based on similarities between the current symptom and problem symptoms. The troubleshooting system calculates for each candidate configuration parameter the similarity between the current symptom and the problem symptom of each occurrence in the support information that has a related problem configuration parameter. The troubleshooting system accumulates the similarities for each candidate configuration parameter and ranks the candidate configuration parameters accordingly. Alternatively, the troubleshooting system may combine the problem symptoms of each occurrence of a candidate configuration parameter into an aggregate problem symptom. The troubleshooting system then calculates the similarity between the current system and the aggregated problem symptom. In one embodiment, the troubleshooting system uses a term frequency by inverse document frequency calculation (e.g., TF*IDF) and cosine similarity calculation to accumulate the similarities. For example, the system may generate a vector of term frequency by inverse document frequency for the terms of each symptom. The system then calculates the similarity between two symptoms by applying a cosine similarity metric to their vectors. The system may then combine the similarity scores for a candidate configuration parameter to provide its rank score. This symptom ranking is based on both symptom and frequency information because a higher number of occurrences with similar symptoms may result in a higher ranking of a candidate configuration parameter.

In one embodiment, the troubleshooting system may identify whether the candidate configuration parameter is related to a problem configuration parameter in various ways. The troubleshooting system may determine that configuration parameters are related when their entire path and value are the same, referred to as "value matching." For example, the candidate configuration parameter of "A\B\C=10" would be related to a problem configuration parameter of "A\B\C=10, " but would not be related to a problem configuration parameter of "A\B\C=1. " Alternatively, the troubleshooting system may determine that configuration parameters are related when their paths are the same, irrespective of their values, referred to as "path matching." For example, the candidate configuration parameter of "A\B\C=10" would be related to the problem configuration parameter of "A\B\C," but would not be related to the problem configuration parameter of "A\B\D=10. " Alternatively, the troubleshooting may determine that configuration parameters are related as long as a prefix of their paths is the same, referred to as "partial-path matching." For example, the candidate configuration parameter of "A\B\C=10" would be related to the problem configuration parameter of "A\B\D=10, " but would not be related to the problem configuration parameter of "D\E\F\G." The troubleshooting system may determine that a partial-path match occurs when all but the last one or two entries of the path match. In one embodiment, the troubleshooting system may weight the frequency ranking or symptom ranking based on the type of matching. For example, the troubleshooting system may weight an occurrence that is a value match or a path match as 100 times that of an occurrence that is a partial-path match. One skilled in the art will appreciate that various weights can be applied to value matching, path matching, and partial-path matching that could be derived empirically from analysis of support information. For example, analysis of support information may indicate that a value match is twice as good as a path match at indicating that an occurrence is relevant to the current problem. In such a case, the troubleshooting system may weight value matches twice that of path matches.

In one embodiment, the troubleshooting system may use a difference set, a trace set, or an intersection set (e.g., generated from a state-based checkpoint analysis as described in the Background) as the candidate set of candidate configuration parameters. If both a difference set and trace set are available, the troubleshooting system can use the intersection set as the candidate set. If, however, a trace set is not available, then the troubleshooting system can use the difference set as the candidate set. Conversely, if a difference set is not available, the troubleshooting system can use the trace set as a candidate set. The troubleshooting system can, however, be used to rank candidate configuration parameters irrespective of the manner in which they are identified. The candidate configuration parameters may even be all the configuration parameters.

In one embodiment, the troubleshooting system may filter a trace set so that it only contains leaf configuration parameters rather than all configuration parameters accessed during execution of an application. When configuration parameters are hierarchically organized, an application may access parent configuration parameters as it locates a leaf configuration parameter. For example, the parent configuration parameters "A," "A\B," and "A\B\C" may be accessed in order to access leaf configuration parameter "A\B\C=10." In some cases, the ranking of the parent configuration parameters may be higher than those of the leaf configuration parameters because of the accumulated path and partial-path matching weights. As a result, the troubleshooting system may remove such parent configuration parameters from the trace set. More generally, the trace set can be filtered to remove noise configuration parameters such as a counter used by the application.

Figure 1:
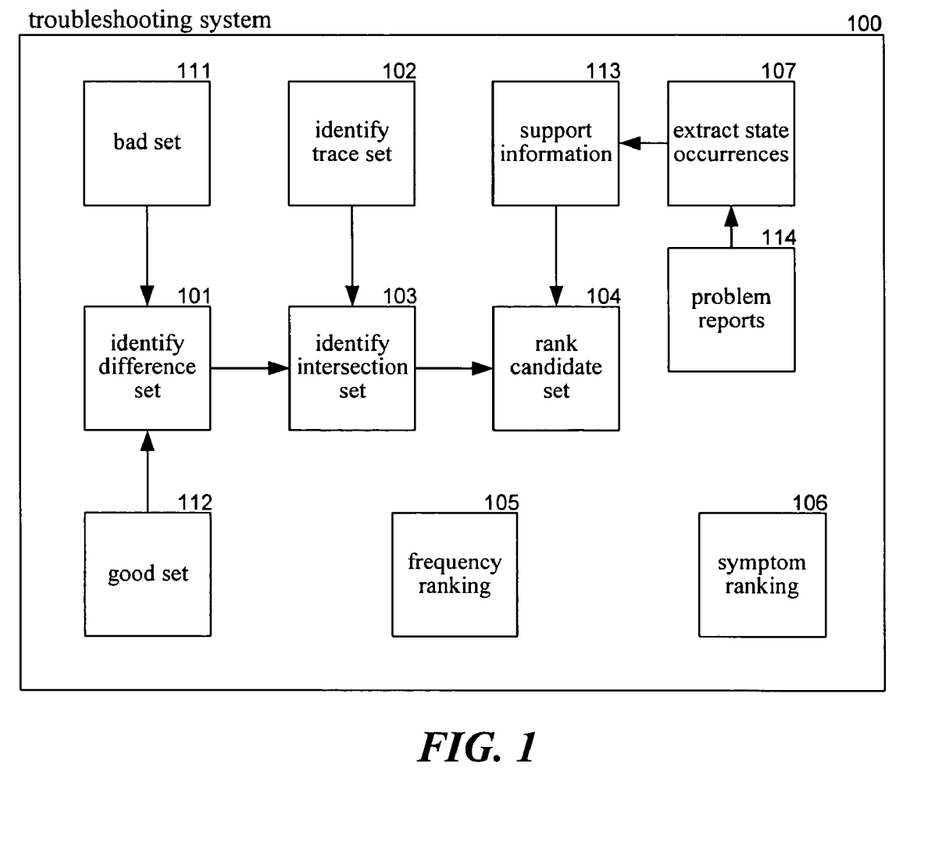
FIG. 1 is a block diagram that illustrates components of the troubleshooting system in one embodiment.

FIG. 1 is a block diagram that illustrates components of the troubleshooting system in one embodiment. The troubleshooting system 100 includes an identify difference set component 101, an identify trace set component 102, an identify intersection set component 103, a rank candidate set component 104, a frequency ranking component 105, a symptom ranking component 106, and an extract state occurrences component 107. The troubleshooting system also includes a bad set data store 111, a good set data store 112, a support information store 113, and a problem reports data store 114. The bad set data store contains configuration parameters associated with an execution of an application when it exhibited the undesired behavior. The good set data store contains configuration parameters associated with an execution of the application when it did not exhibit the undesired behavior. The good set data store may contain state-based checkpoint information generated before the component started exhibiting the undesired behavior. The identify difference set component identifies the difference set of configuration parameters that are different in the bad set and the good set. The identify trace set component identifies the trace set of configuration parameters accessed by the application when it exhibited the undesired behavior. In one embodiment, the troubleshooting system may filter out parent configuration parameters from the trace set. The identify intersection set component inputs the trace set and the difference set and identifies the intersection set of those configuration parameters that are common to both sets. The problem reports data store contains the collection of problem reports generated by technical support personnel. The extract state occurrences component processes the problem reports and generates state occurrences that, in one embodiment, represent the state, symptom, software, and solution four-tuples. The extract state occurrences component stores those occurrences in the support information data store. The extract state occurrences component may identify the configuration parameter of an occurrence corresponding to a problem report from the solution within the problem report. To extract the configuration parameters, the extract state occurrences component may collect configuration parameters from a configuration data store (e.g., Windows registry file) and then search for those configuration parameters in the solution portion of the problem reports. The extract state occurrences component may also normalize the configuration parameters; for example, user names in the path may be canonicalized (e.g., "Smith" replaced with "username"), capitalization may be made consistent, and so on. The rank candidate set component uses the intersection set as the candidate set and invokes the frequency ranking component or the symptom ranking component to rank the candidate configuration parameters. In one embodiment, the rank candidate set component may also use the trace set or the difference set as the candidate set.

The computing devices on which the troubleshooting system may be implemented include a central processing unit, memory, input devices (e.g., keyboard and pointing devices), output devices (e.g., display devices), and storage devices (e.g., disk drives). The memory and storage devices are computer-readable media that may contain instructions that implement the troubleshooting system. In addition, data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the troubleshooting system may be implemented. The operating environment is only one example of a suitable operating environment and is not intended to suggest any limitation as to the scope of use or functionality of the troubleshooting system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The troubleshooting system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The term "application" refers to any type of executing software such as drivers, kernel-mode code, operating systems, system utilities, web servers, database servers, and so on.

Figure 2:
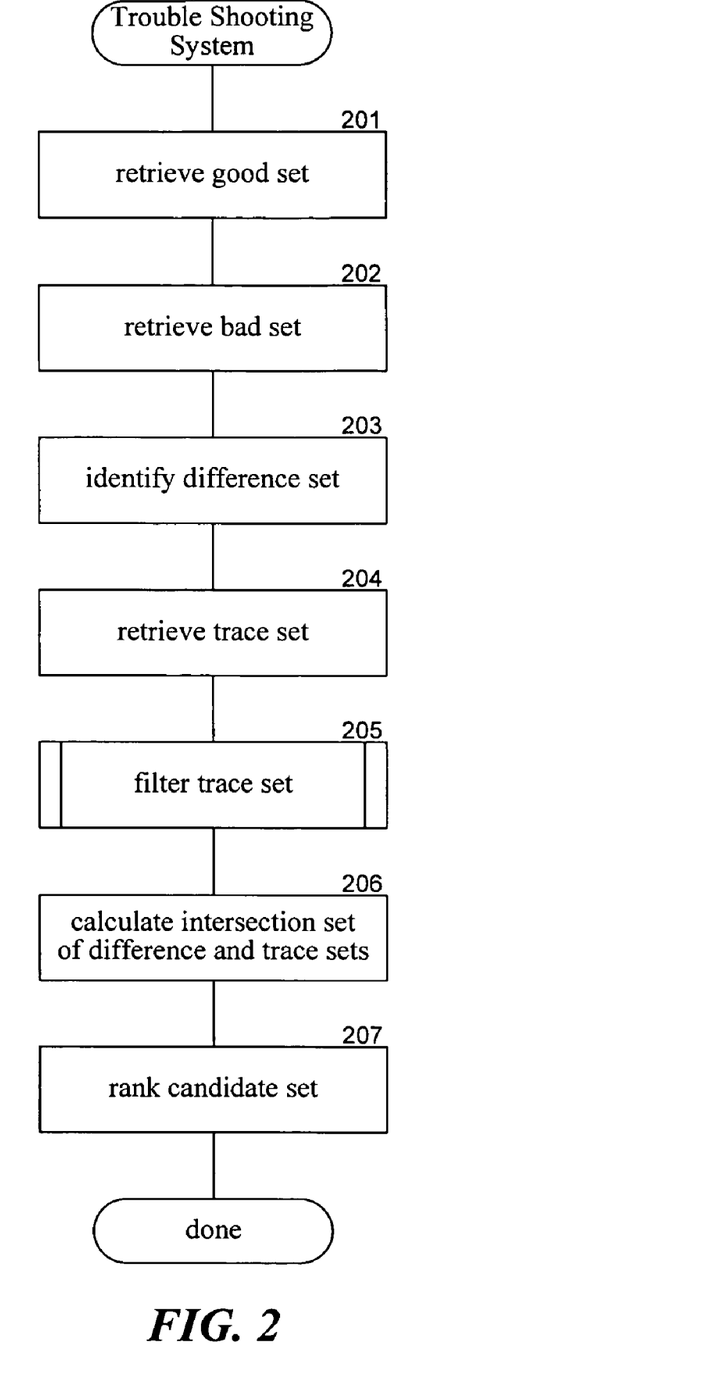
FIG. 2 is a flow diagram that illustrates the processing of the troubleshooting system in one embodiment.

FIG. 2 is a flow diagram that illustrates the processing of the troubleshooting system in one embodiment. Although the troubleshooting system is described as identifying the candidate configuration parameters, support information-based ranking is not dependent on the manner in which candidate configuration parameters are identified. In block 201, the component retrieves the good set of configuration parameters from the good set data store. In block 202, the component retrieves the bad set of configuration parameters from the bad set data store. In block 203, the component identifies the difference set based on the bad set and the good set. In block 204, the component retrieves the trace set of configuration parameters. In block 205, the component filters the trace set to remove any parent configuration parameters. The component may generate a tree structure of the trace configuration parameters and remove all trace configuration parameters that are not leaf configuration parameters. In block 206, the component identifies the intersection set as the intersection of the difference set and the trace set. In block 207, the component uses the intersection set as the candidate set and ranks the candidate configuration parameters according to frequency ranking or system ranking and then completes.

Figure 3:
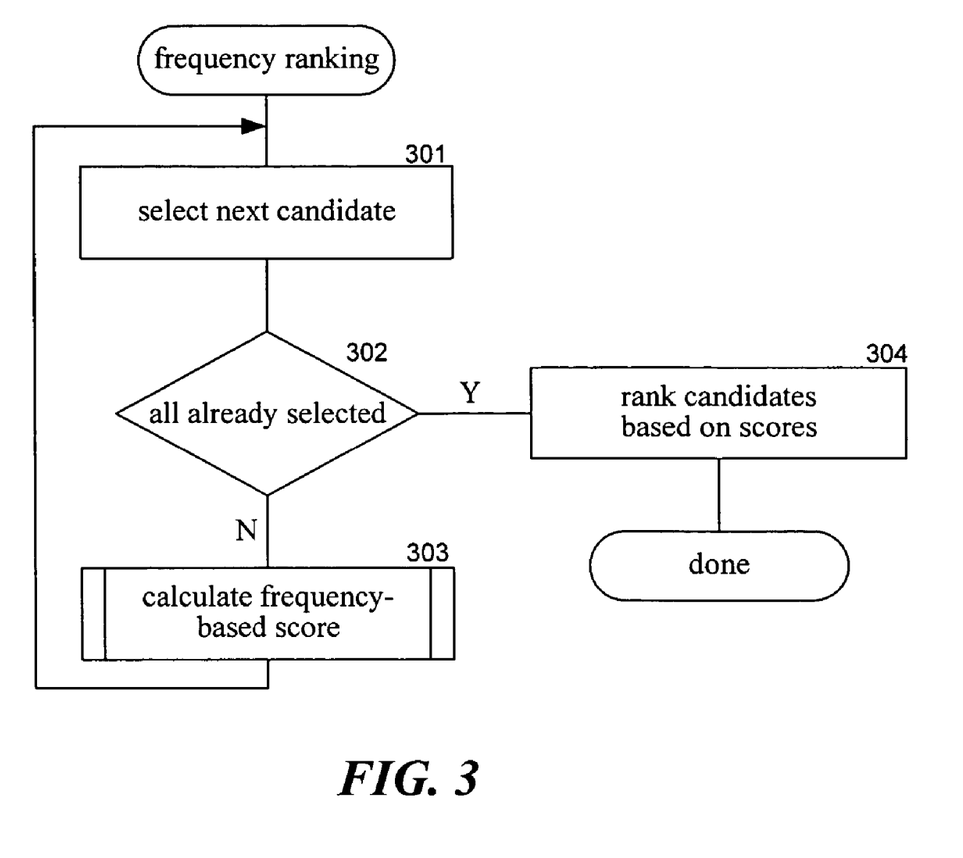
FIG. 3 is a flow diagram that illustrates the processing of the frequency ranking component in one embodiment.

FIG. 3 is a flow diagram that illustrates the processing of the frequency ranking component in one embodiment. The component calculates a frequency-based score for each candidate configuration parameter and then ranks them based on their scores. In blocks 301-303, the component loops calculating a frequency-based score for each candidate configuration parameter. In block 301, the component selects the next candidate configuration parameter. In decision block 302, if all the candidate configuration parameters have already been selected, then the component continues at block 304, else the component continues at block 303. In block 303, the component calculates a frequency-based score for the selected candidate configuration parameter and then loops to block 301 to select the next next configuration parameter. In block 304, the component ranks the candidate configuration parameters based on their scores and then completes.

Figure 4:
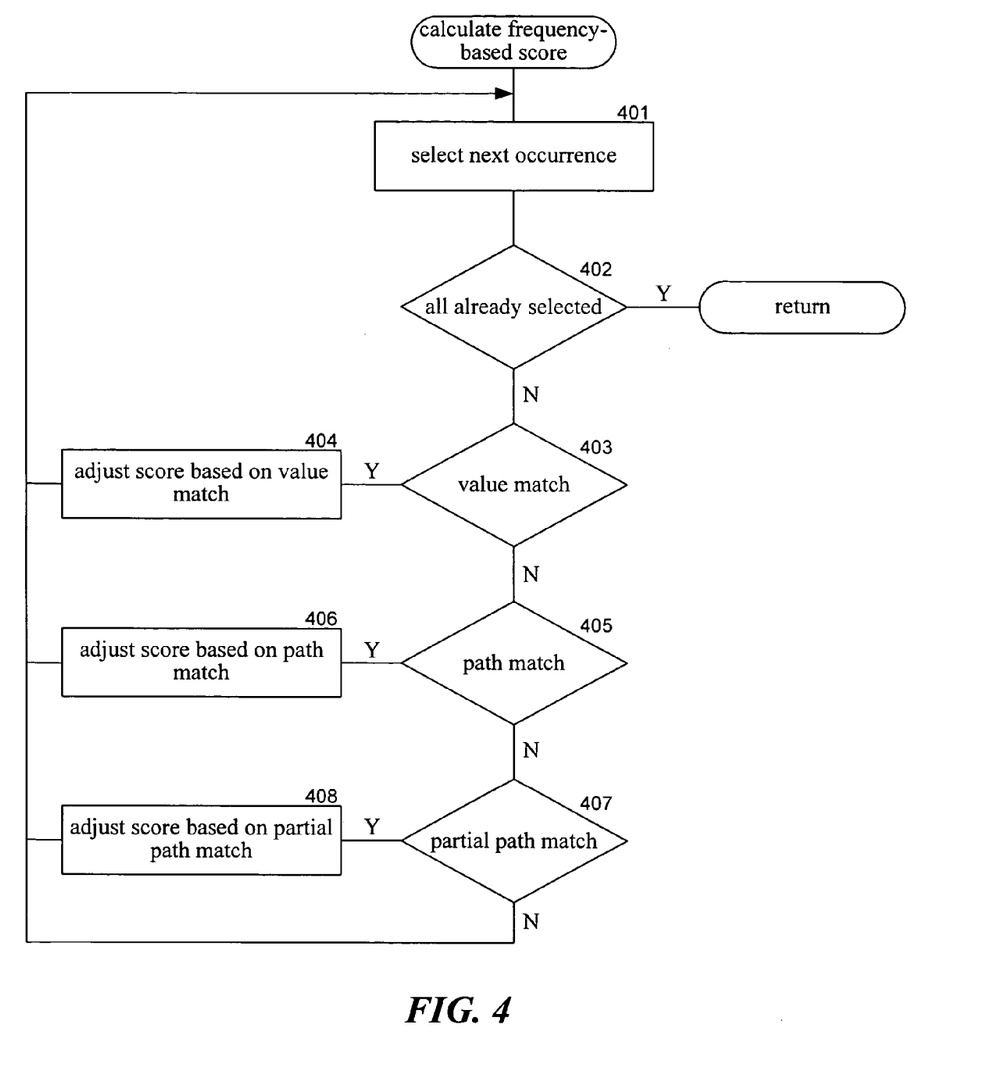
FIG. 4 is a flow diagram that illustrates the processing of the calculate frequency-based score component in one embodiment.

FIG. 4 is a flow diagram that illustrates the processing of a calculate frequency-based score component in one embodiment. The component is passed a candidate configuration parameter and returns a frequency-based score for that configuration parameter. The component loops comparing the candidate configuration parameter to the problem configuration parameters within the occurrences of support information. The component adds to the score for that candidate configuration parameter based on the degree of relatedness of the candidate configuration parameter to the problem configuration parameter. The component starts out with a score of zero. In block 401, the component selects the next occurrence in the support information. In decision block 402, if all the occurrences have already been selected, then the component returns the score, else the component continues at block 403. In decision block 403, if the candidate configuration parameter is a value match with the problem configuration parameter of the selected occurrence, then the component continues at block 404, else the component continues at block 405. In block 404, the component adjusts the score based on the value match and then loops to block 401 to select the next occurrence. In decision block 405, if the candidate configuration parameter is a path match with the problem configuration parameter of the selected occurrence, then the component continues at block 406, else the component continues at block 407. In block 406, the component adjusts the score based on the path match and then loops to block 401 to select the next occurrence. In decision block 407, if the candidate configuration parameter is a partial-path match with the problem configuration parameter of the selected occurrence, then the component continues at block 408, else the component loops to block 401 to select the next occurrence without adjusting the score. In block 408, the component adjusts the score based on the partial-path match and loops to block 401 to select the next occurrence. In one embodiment, the troubleshooting system may preprocess the support information to facilitate the identification of value, path, and partial-path matches. For example, the troubleshooting system may sort the occurrences based on their problem configuration parameter, generate an auxiliary data structure (e.g., index) for retrieving the occurrences quickly, generate a frequency counter for occurrences that contain the same problem configuration parameter or parent problem configuration parameter, and so on.

Figure 5:
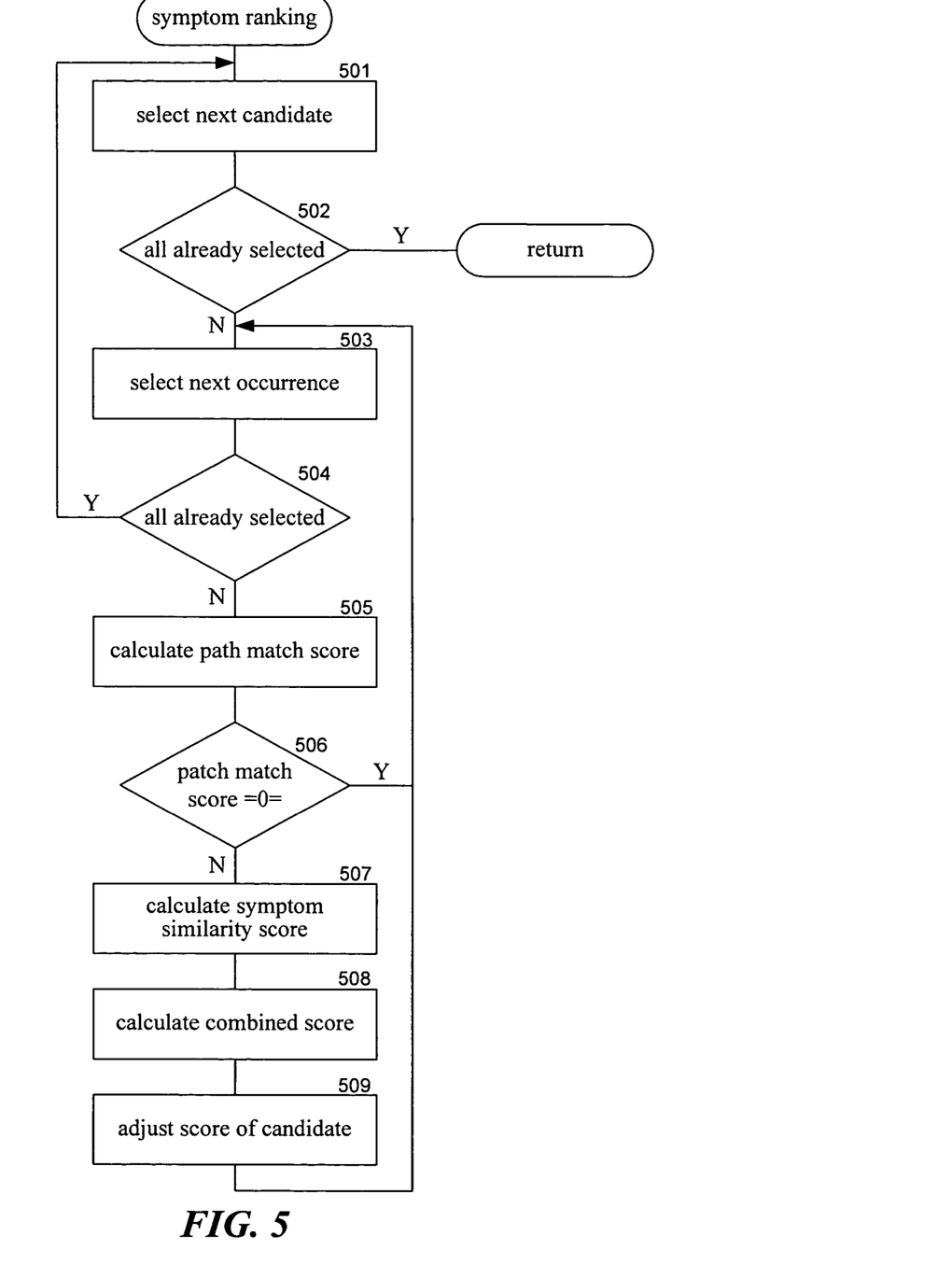
FIG. 5 is a flow diagram that illustrates the processing of the symptom-ranking component in one embodiment.

FIG. 5 is a flow diagram that illustrates the processing of the symptom-ranking component in one embodiment. The component loops selecting a candidate configuration parameter and then selecting occurrences and calculating a symptom-based similarity score. In block 501, the component selects the next candidate configuration parameter. In decision block 502, if all the candidate configuration parameters have already been selected, then the component returns, else the component continues at block 503. In blocks 503-509, the component loops selecting each occurrence in the support information and adjusting the score for the selected candidate configuration parameter based on the similarity of the symptoms. In block 503, the component selects the next occurrence in the support information. In decision block 504, if all the occurrences have already been selected, then the component loops to block 501 to select the next candidate configuration parameter, else the component continues at block 505. In block 505, the component calculates a match score between the selected candidate configuration parameter and the problem configuration parameter of the selected occurrence. A match score may be a value between 0 and 1 to indicate the relatedness of the configuration parameters. In decision block 506, if the match score is zero, then the configuration parameters are not similar and the component loops to block 503 to select the next occurrence, else the component continues at block 507. In block 507, the component calculates a symptom similarity score between the current symptom and the symptom of the selected occurrence, for example, by using a term frequency by inverse document frequency metric and a cosine similarity metric. In block 508, the component combines the match score and the similarity score, for example, by multiplying the scores. In block 509, the component adjusts the candidate score for the selected candidate configuration parameter based on the combined score, for example, by adding the combined score to the candidate score, and then loops to block 503 to select the next occurrence.

One skilled in the art will appreciate that although specific embodiments of the troubleshooting system have been described for purposes of illustration, various modifications may be made without deviating from the spirit and scope of the invention. The troubleshooting system can also be used to identify hardware configuration problems. For example, if user computers include special-purpose signal processing hardware with configuration parameters, then the candidate configuration parameters can be configuration parameters of that hardware when the user computer exhibits an undesired behavior. More generally, the troubleshooting system can be used in an environment with configuration parameters such as settings for television set-top boxes, cell phones, automobiles, and so on. The techniques of the troubleshooting system can also be used to identify information generally that may be causing a certain behavior, whether desired or undesired. For example, the execution of an application may be adversely affected by the overall configuration of the computer system on which it is executing. As an example, the undesired behavior may be caused by a missing operating system component, an outdated driver, insufficient main memory, interactions with a user, URL parameters, API parameters, and so on. This type of information that may cause the undesired behavior is referred to as "state information" that represents the state of the user computer that is exhibiting the undesired behavior. A configuration parameter is one type of state information. The four-tuples of the occurrences could include this type of information as its state.

We claim:

1. A method in a computer system for identifying a state information that may be causing a component to exhibit a certain behavior, the method comprising:
   identifying difference configuration parameters based on differences between configuration parameters before the certain behavior was and was not exhibited by the component;
   collecting trace configuration parameters during execution of the component in which the certain behavior was exhibited;
   providing candidate state information that may be causing the component to exhibit the certain behavior, wherein the state information is a configuration parameter and the candidate configuration parameters is identified based on an intersection of
      difference configuration parameters identified based on differences between configuration parameters when the certain behavior was and was not exhibited and trace configuration parameters identified during execution of the component in which the certain behavior was exhibited;
   providing support information relating to problems resulting from problem state information, the support information being collected from problem reports generated by product support personnel when troubleshooting problems that users encounter with the component; and
   ranking the candidate state information as likely causing the component to exhibit the certain behavior based on analysis of the support information.

2. The method of claim 1 wherein the state information is a configuration parameter and the support information includes, for an occurrence of a problem, a problem configuration parameter.

3. The method of claim 2 wherein the ranking of a candidate configuration parameter is based on frequency with which problem configuration parameters relating to the candidate configuration parameter occur in the support information.

4. The method of claim 2 including providing a current symptom of the certain behavior and problem symptoms for the problems of the support information and wherein the ranking of a candidate configuration parameter is based on similarity between the current symptom and the problem symptoms of the problem configuration parameters.

5. The method of claim 4 wherein the ranking is based on term frequency by inverted document frequency.

6. The method of claim 5 wherein a symptom is a document.

7. The method of claim 5 wherein the ranking is based on a cosine similarity.

8. The method of claim 2 wherein the configuration parameters are hierarchically defined as paths and values and a problem configuration parameter is related to a candidate configuration parameter when their paths and values are the same.

9. The method of claim 2 wherein the configuration parameters are hierarchically defined as paths and values and a problem configuration parameter is related to a candidate configuration parameter when their paths are the same.

10. The method of claim 2 wherein the configuration parameters are hierarchically defined as paths and values and a problem configuration parameter is related to a candidate configuration parameter when a portion of their paths is the same.

11. The method of claim 2 wherein the configuration parameters are hierarchically defined as paths and values and a problem configuration parameter is related to a candidate configuration parameter based on path matching and value matching.

12. The method of claim 11 wherein the ranking is weighted based on extent of path matching and value matching.

13. The method of claim 2 wherein the configuration parameters are hierarchically defined as paths and values and including filtering the candidate configuration parameters to remove candidate configuration parameters that are parents of other candidate configuration parameters.

14. The method of claim 1 wherein the support information includes state, symptom, software, and solution information.

15. The method of claim 1 wherein the candidate state information is identified based on differences between state information when the certain behavior was and was not exhibited.

16. The method of claim 1 wherein the candidate state information is identified during execution of the component in which the certain behavior was exhibited.

17. The method of claim 1 wherein the ranking is frequency ranking.

18. The method of claim 1 wherein the ranking is symptom ranking.

19. A computer-readable medium containing instructions for controlling a computer system to identify a configuration parameter that may be causing a component to exhibit a certain behavior, by a method comprising:
   providing candidate configuration parameters that may be causing the component to exhibit the certain behavior;
   providing occurrences of problem configuration parameters associated with problems at user computers, the occurrences being collected from users reporting problems resulting from configuration parameters of user computers; and
   ranking a candidate configuration parameter as likely causing the component to exhibit the certain behavior based on number of occurrences of problem configuration parameters that are related to the candidate configuration parameter wherein the configuration parameters are hierarchically defined as paths and values and a problem configuration parameter is related to a candidate configuration parameter based on comparison of the paths and values.

20. The computer-readable medium of claim 19 wherein the configuration parameters are hierarchically defined as paths and values and a problem configuration parameter is related to a candidate configuration parameter when their paths and values are the same.

21. The computer-readable medium of claim 19 wherein the configuration parameters are hierarchically defined as paths and values and a problem configuration parameter is related to a candidate configuration parameter when their paths are the same.

22. The computer-readable medium of claim 19 wherein the configuration parameters are hierarchically defined as paths and values and a problem configuration parameter is related to a candidate configuration parameter when a portion of their paths is the same.

23. The computer-readable medium of claim 19 wherein the configuration parameters are hierarchically defined as paths and values and a problem configuration parameter is related to a candidate configuration parameter based on path matching and value matching.

24. The computer-readable medium of claim 23 wherein the ranking is weighted based on extent of path matching and value matching.

25. The computer-readable medium of claim 19 wherein the configuration parameters are hierarchically defined as paths and values and including filtering configuration parameters to remove configuration parameters that are parents of other configuration parameters.

26. The computer-readable medium of claim 19 wherein each occurrence of a problem includes state, symptom, software, and solution information, wherein state is a problem configuration parameter and software is the component.

27. The computer-readable medium of claim 19 including providing a current symptom of the certain behavior and problem symptoms for the occurrences of problem configuration parameters and wherein the ranking of a candidate configuration parameter is further based on similarity between the current symptom and a problem symptom of an occurrence.

28. A computer-readable medium containing instructions for controlling a computer system to identify a configuration parameter that may be causing a component to exhibit a certain behavior, by a method comprising:
  providing a current symptom of the certain behavior and candidate configuration parameters that may be causing the component to exhibit the certain behavior;
  providing occurrences of problem configuration parameters associated with problems at user computers, each occurrence having a problem symptom, the occurrences being collected from problem reports generated by product support personnel when troubleshooting problems that users encounter with the component; and
  ranking a candidate configuration parameter as likely causing the component to exhibit the certain behavior based on similarity between the current symptom and a problem symptom of an occurrence
  wherein the configuration parameters are hierarchically defined as paths and values and a problem configuration parameter is related to a candidate configuration parameter based on comparison of the path and value.

29. The computer-readable medium of claim 28 wherein the ranking is based on term frequency by inverted document frequency.

30. The computer-readable medium of claim 29 wherein a symptom is a document.

31. The computer-readable medium of claim 29 wherein the ranking is based on a cosine similarity.

32. The computer-readable medium of claim 28 wherein the configuration parameters are hierarchically defined as paths and values and a problem configuration parameter is related to a candidate configuration parameter based on path matching and value matching.

33. The computer-readable medium of claim 28 wherein the ranking is weighted based on extent of path matching and value matching.

34. The computer-readable medium of claim 28 wherein the configuration parameters are hierarchically defined as paths and values and including filtering configuration parameters to remove configuration parameters that are parents of other configuration parameters.

35. The computer-readable medium of claim 28 wherein each occurrence of a problem includes state, symptom, software, and solution information, wherein state is a problem configuration parameter and software is the component.

* * * * *